United States Patent
Polansky et al.

(10) Patent No.: US 9,288,594 B1
(45) Date of Patent: Mar. 15, 2016

(54) AUDITORY ENVIRONMENT RECOGNITION

(71) Applicant: Amazon Technologies, Inc., Reno, NV (US)

(72) Inventors: Stephen Michael Polansky, Santa Clara, CA (US); Yuzo Watanabe, Seattle, WA (US); Matthew Paul Bell, Sunol, CA (US)

(73) Assignee: Amazon Technologies, Inc., Reno, NV (US)

( * ) Notice: Subject to any disclaimer, the term of this patent is extended or adjusted under 35 U.S.C. 154(b) by 312 days.

(21) Appl. No.: 13/717,085

(22) Filed: Dec. 17, 2012

(51) Int. Cl.
 *H04R 29/00* (2006.01)
(52) U.S. Cl.
 CPC ...................................... *H04R 29/00* (2013.01)
(58) Field of Classification Search
 CPC ................................ H04N 11/00; G01H 3/14
 USPC .......................................................... 381/56
 See application file for complete search history.

(56) References Cited

U.S. PATENT DOCUMENTS

| 2011/0241827 | A1* | 10/2011 | Varoglu | H04B 7/185 340/5.52 |
| 2012/0052872 | A1* | 3/2012 | Do | G01S 5/18 455/456.1 |
| 2013/0084818 | A1* | 4/2013 | Croman | H04W 52/0245 455/226.1 |

* cited by examiner

*Primary Examiner* — Simon King
(74) *Attorney, Agent, or Firm* — Novak Druce Connolly Bove + Quigg LLP

(57) ABSTRACT

A computing device can capture audio data representative of audio content present in a current environment. The captured audio data can be compared with audio models to locate a matching audio model. The matching audio model can be associated with an environment. The current environment can be identified based on the environment associated with the matching audio model. In some embodiments, information about the identified current environment can be provided to at least one application executing on the computing device. The at least one the application can be configured to adjust at least one functional aspect based at least in part upon the determined current environment. In some embodiments, one or more computing tasks performed by the computing device can be improved based on information relating to the identified current environment. These computing tasks can include location refinement, location classification, and speech recognition.

26 Claims, 12 Drawing Sheets

AUDITORY ENVIRONMENT RECOGNITION

BACKGROUND

A computing device is often carried along by a user throughout the day. The computing device can be used by the user to provide mapping information, navigational directions, and to search for establishments such as stores and restaurants. Furthermore, the computing device can utilize speech recognition to perform one or more tasks requested by the user's spoken commands. Often times, there can be sounds, such as background noise, associated with the current environment in which the user and the computing device are situated. The sounds can vary depending on the current environment of the user and computing device. For example, the sounds of a restaurant can be quite different from the sounds of an airport. In another example, a particular auditorium can sound differently when different events are occurring at the auditorium. Because the types of sounds vary widely, it is difficult to accurately filter out background noise without risk of inadvertently filtering some of the intended audio input.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to utilizing information found in a computing device's surroundings. In particular, various embodiments of the present disclosure can utilize the audio content present in an environment to refine the device's current location, to classify/categorize the environment, and to improve speech recognition based on the environment.

At least some embodiments enable a computing device to capture audio data representative of audio content present in a current environment of the computing device. The audio content can be captured by one or more microphones or other audio sensors on the computing device. The audio content can be compared with one or more audio models in order to identify at least one audio model matching the captured audio content within an allowable deviation. Each of the audio models can be associated (e.g., tagged) with an environment. The audio models can be stored in a database on the computing device and/or on a server external to the device. Similarly, the comparing can be performed on the device and/or on a server external to the device. The comparing of the captured audio content with the audio models to locate a matching audio model can be based on analyzing audio properties such as audio patterns, frequencies, pitches, tones, etc. found in the captured audio content and in the audio models.

The current environment of the computing device (and the captured audio content) can then be identified based on the environment associated with the matching audio model. For example, if the environment associated with the matching audio model corresponds to a bar, then the current environment can be identified as being a bar. In another example, if the environment associated with the matching audio model corresponds to Los Angeles International Airport (LAX), then the current environment can be identified as being LAX. Based on the identified current environment, various computing tasks performed by the computing device can be improved.

For example, if the identified current environment has an address, then a current location determined by the computing device (e.g., if inaccurate) can be adjusted to be more accurate based on the address. In another example, if a current location determined by the computing device is uncategorized or unlabeled (e.g., a new establishment), then the location can be categorized/classified or labeled based on the identified current environment (e.g., a restaurant). In a further example, in response to identifying the current environment, a noise filtering technique customized for (e.g., optimized for) the identified current environment can be applied during speech recognition in order to improve the accuracy of the capturing of the user's speech (e.g., voice commands, voice dictation, etc.).

Figure 1:
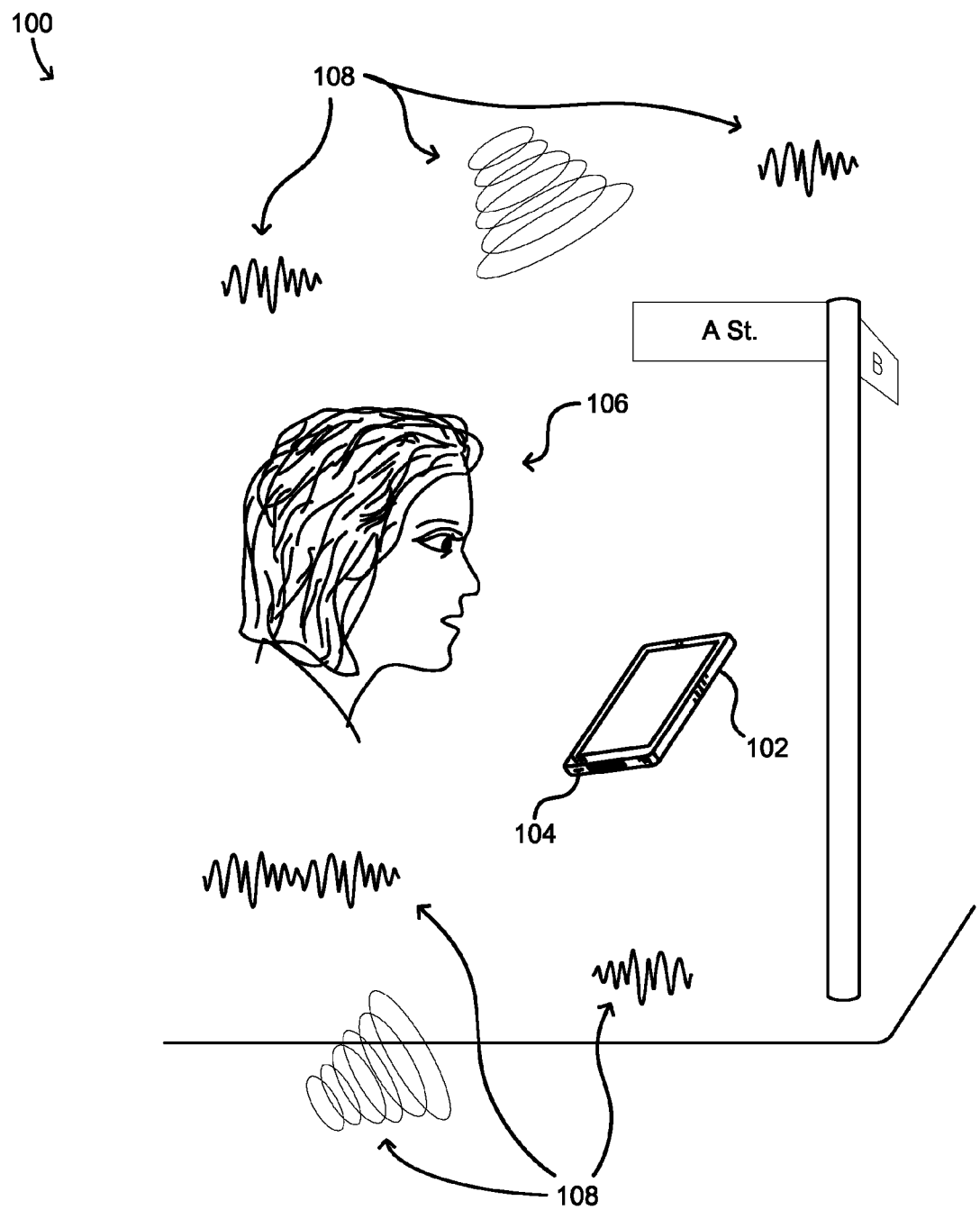
FIG. 1 illustrates an example environment in which aspects of the various embodiments can be utilized.

In some embodiments, audio data can be captured using at least one audio sensor on a computing device. A current environment of the computing device can be determined based at least in part upon analyzing the captured audio data. Information about the determined current environment can be provided to at least one application executing on the computing device. The at least one application can be configured to adjust at least one functional aspect based at least in part upon the determined current environment. In some embodiments, the adjusting of the at least one functional aspect can include at least one of refining a current location of the computing device, identifying a classification for the current environment, or applying noise filtering customized for the current environment during speech recognition Various other functions and advantages are described and suggested below as may be provided in accordance with the various embodiments FIG. 1 illustrates an example environment in which aspects of the various embodiments can be utilized. In the example environment 100 of FIG. 1, there can be a computing device 102. The computing device 102 can comprise at least one microphone 104. A user 106 of the computing device 102 can be operating the computing device 102. In the example environment 100, the user 106 is using the computing device 102 at a particular location, for example, the intersection of A Street and B Street.

As shown in FIG. 1, there can be various sounds 108 at the location where A Street and B Street intersect. These sounds (i.e., audio data) 108 can include, but is not limited to, voices, construction noise, traffic noise, airplane noise, sounds of nature, background noise, etc. In some embodiments, the sounds of a particular location can be unique to that location. For example, perhaps the sounds of a certain theme park are unique to it and no other place in the world; the particular sound of that theme park's theme music combined with the particular sounds of the roller coasters in that theme park might form a unique stream of audio not found elsewhere. In some embodiments, the sounds of a particular location can be of a particular type but can be found at other locations too. In other words, sounds from one location may belong to a particular type/classification/category (e.g., sounds from a bar, sounds from an airport, sounds from a park, etc.), but may be difficult to tell apart from those at another similar location. For example, the sounds found in a particular bar might be similar to the sounds found in another bar; the sounds from the former bar and those from the latter bar may be indistinguishable or too computationally intensive to attempt to distinguish, but they might be similar enough to each other (and different enough from other sounds) to be placed in the same audio type/classification/category.

In some embodiments, audio data (e.g., sounds) can be captured by the at least one microphone 104 on the computing device 102. The captured audio data can be compared with one or more audio models stored in a database in order to find at least one audio model matching the captured audio data within an allowable deviation. For example, the computing device 102 (or a server external but communicatively connected to the computing device 102) can comprise a database that stores audio models, each of which is associated with a type/classification/category of environment and/or with a particular environment. The captured audio data can be compared with the audio models to find a match within an allowable deviation. In some embodiments, the audio models can be acoustic models, noise models, vibration models, sound wave models, sound source models, sound field models, etc., or any combination thereof.

In some embodiments, the matching audio model can be associated with a particular environment (e.g., in Elephant Bar, in McDonald's, in SFO, in the user's car, in Central Park, etc.) and/or a particular type of environment (e.g., in a bar, in a restaurant, in an airport, in a car, in a park, etc.). In response to locating the matching audio model, a current environment (and/or a current type of environment) of the computing device and captured audio data can be identified as being the environment (and/or a type of environment) of the matching audio model. In some embodiments, if the matching audio model is associated with a particular environment including a particular address, then the captured audio data can be associated with the particular address.

Upon identifying a current environment of the computing device and captured audio, the performance(s) of various computing tasks can be improved based on the identified current environment. In some embodiments, the identified current environment of the captured audio data can help to refine a current location of the computing device 102. In some embodiments, the identified current environment can help to classify or categorize a current location of the computing device 102. In some embodiments, the identified current environment can improve speech recognition, for example, speech from the user 106 to be recognized by the computing device 102. It is contemplated that a person of ordinary skill in the art would know of additional computing tasks that can be improved based on the identification of the current environment of the captured audio data.

Figure 2:
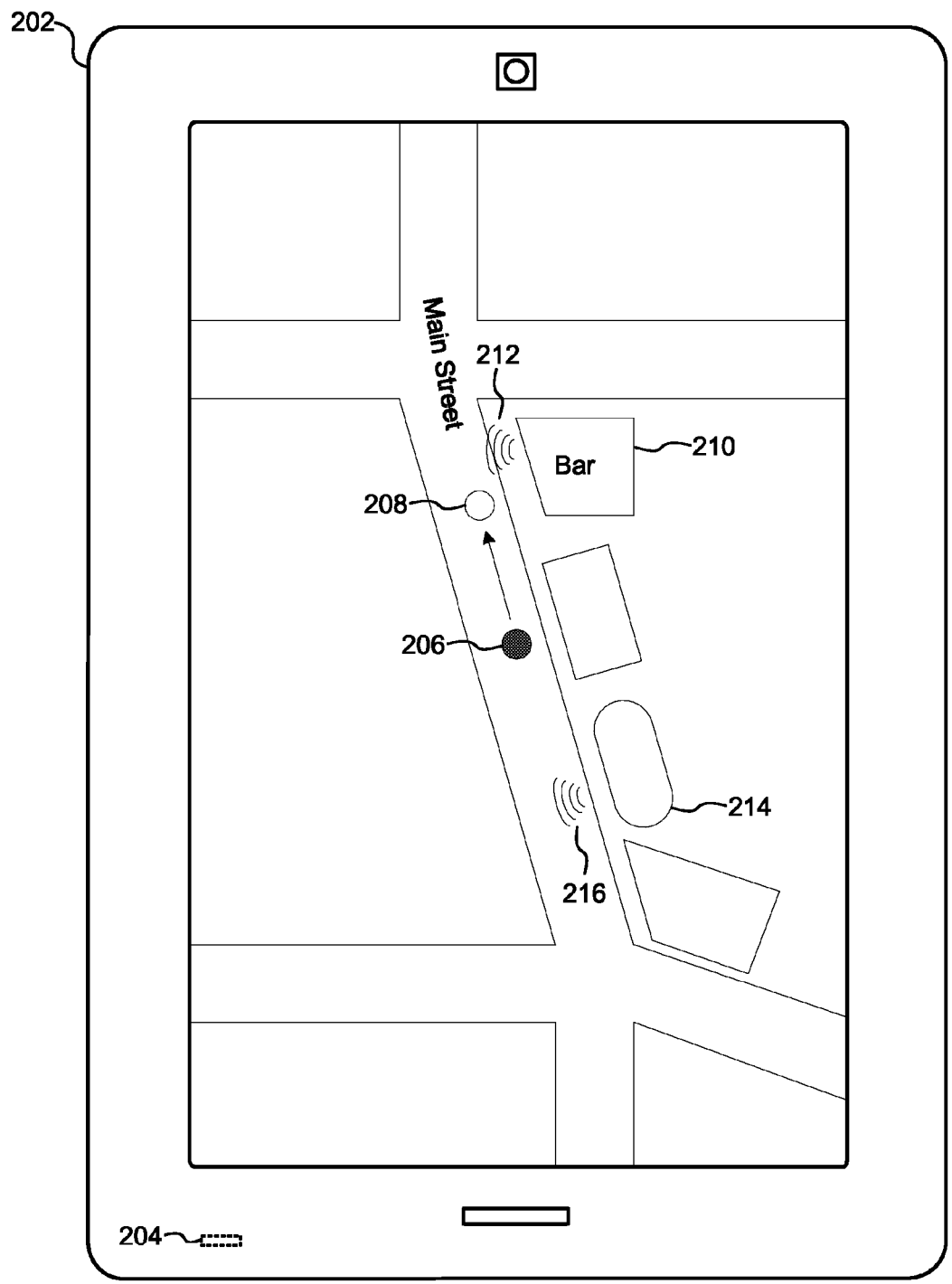
FIG. 2 illustrates an example device embodiment for auditory environment recognition.

FIG. 2 illustrates an example device embodiment for auditory environment recognition.

The example device embodiment 202 can comprise at least one microphone 204, which can be configured to capture audio data. In FIG. 2, the example device 202 is configured to utilize auditory environment recognition for location refinement. In some embodiments, the example computing device 204 can determine its current location by using multilateration of radio signals (e.g., cellular triangulation), global positioning system (GPS), other similar positioning techniques, and/or any combination thereof. However, in some cases, the determined current location might not be where the computing device 202 is actually located.

For example, the computing device 202 can be running a mapping application. In the mapping application, the determined current location (e.g., using radio signal multilateration, GPS, etc.) of the device 202 can be marked at 208. However, the actual current location of the computing device 202 with respect to the map presented by the mapping application can be marked at 208; (the mark 208 of the actual current location need not be displayed by the mapping application). In other words, in some cases, the determined current location of the computing device 202 might only be accurate to within a certain distance, e.g., accurate to be within 10 feet. For example, the determined current location can be placed at approximately the middle of a block on Main Street (206), whereas in actuality the current location of the device 202 is closer to the northern end of the block (208). At the northern end of the block, there happens to be a bar 210. The bar 210 generates audio content 212 in the form of patrons talking, music playing, glasses clanking, television(s) playing, etc. In addition, there can be other sounds coming from other areas on the block, such as construction noise 216 coming out of a store 214 being renovated.

Continuing with the example, the computing device 202 can capture audio data at its actual current location (marked by 208), which is near the bar 210. The captured audio data can include the sound 212 from the bar 210. Other sounds such as the construction noise 216 from the store being renovated 214 can be too far away to be captured by the device 202 or can be predominated/drowned out by the sound 212 from the bar 210 (e.g., due to the close proximity between the device 202 and the bar 210). The captured audio data can be compared with audio models stored in a database on the device 202 and/or on a server external to the device 202. Utilizing audio matching algorithms, for example, an audio model matching the captured audio data within an allowable deviation can be determined/located. The matching audio model can be associated with a particular environment and/or with a particular environment type. For example, the captured audio content 212 from the bar 210 can match an audio model for a bar (i.e., particular environment type) and/or a specific bar (i.e., particular environment). Accordingly, a current environment (particular environment type and/or particular environment) of the captured audio data can be identified to be the environment of the matching audio model. In this example, the captured sound 212 from the bar 210 can match an audio model associated a bar (i.e., a particular environment type).

Continuing with the example, the device 202 can recognize that its current location is actually closer to the bar 210, rather than to the store under construction 214. As such, it can search for bars near its determined current location. The device 202 can receive information that the bar nearest its determined current location 206 is the Elephant Bar at 1234 Main Street (206). Therefore, the (mapping application running on the) device 202 can adjust its determined current location 206 to its actual current location 208.

In some embodiments, the (mapping application on the) device 206 can receive location information from the matching audio model. For example, in some embodiments, the matching audio model can be associated (tagged) with not only an environment type, but also with a particular (i.e., specific) environment, such as the Elephant Bar located at 1234 Main Street. Thus, the current environment of the captured sound 212 can be identified as being the Elephant Bar located at 1234 Main Street and the determined current location (206) can be adjusted to be the actual current location, e.g., at 1234 Main Street (208). In some embodiments, the matching audio model can already be associated (e.g., tagged) with the address 1234 Main Street. In some embodiments, the address of Elephant Bar can be looked up, e.g., on the Internet.

In some embodiments, crowd sourcing can be used to generate and/or modify (e.g., update) the associations between audio models and environments (environment types and specific environments). Moreover, the audio models can be trained and can improve over time. For example, the captured sound 212 being identified as being associated with the Elephant Bar at 1234 Main Street can be utilized to further train, adjust, and/or improve the audio model matching the captured sound 212. An audio model's association(s) can be added, removed, or modified as well.

Figure 3A:
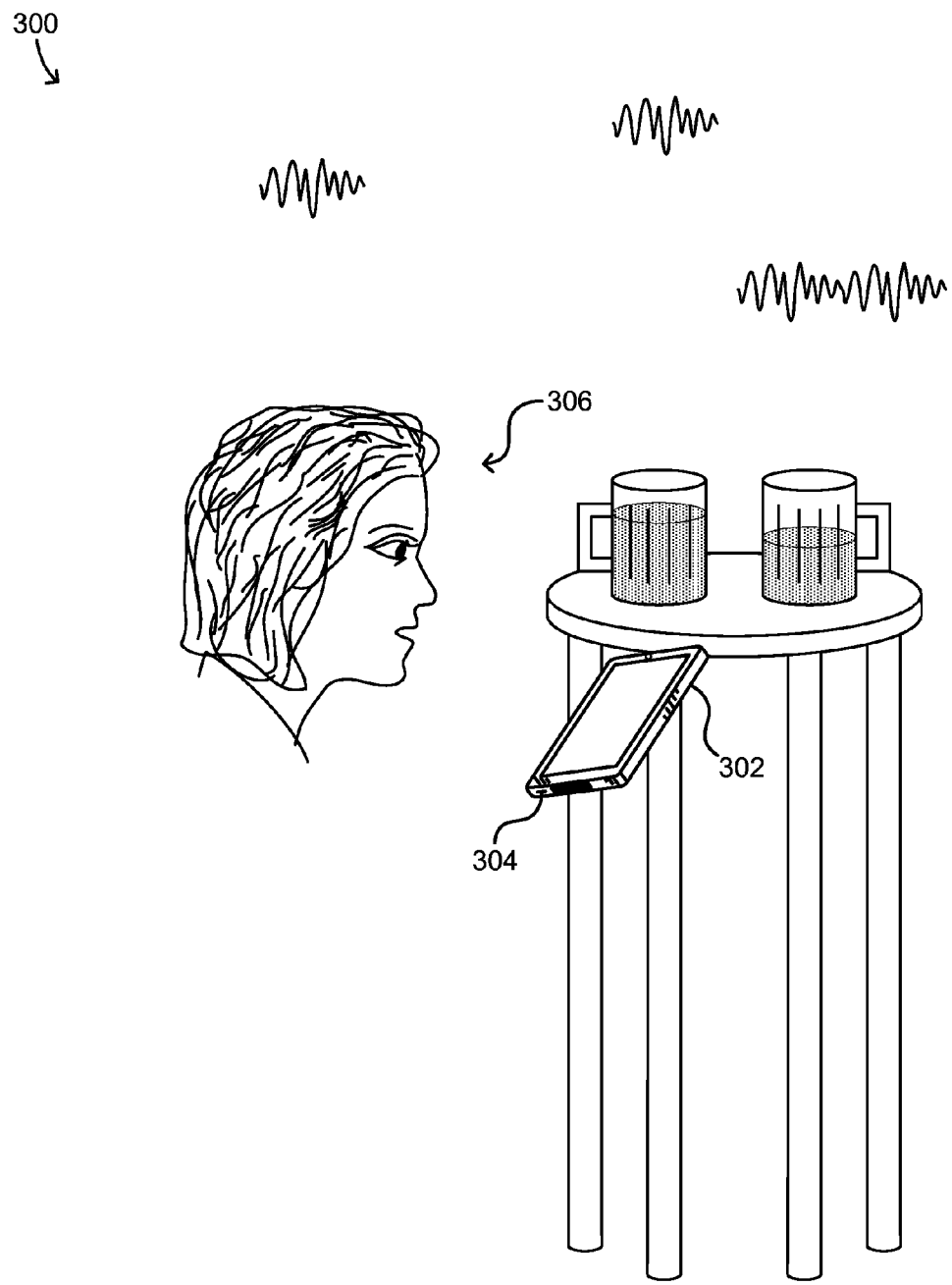
FIG. 3A illustrates an example environment in which auditory environment recognition can be utilized.
Figure 3B:
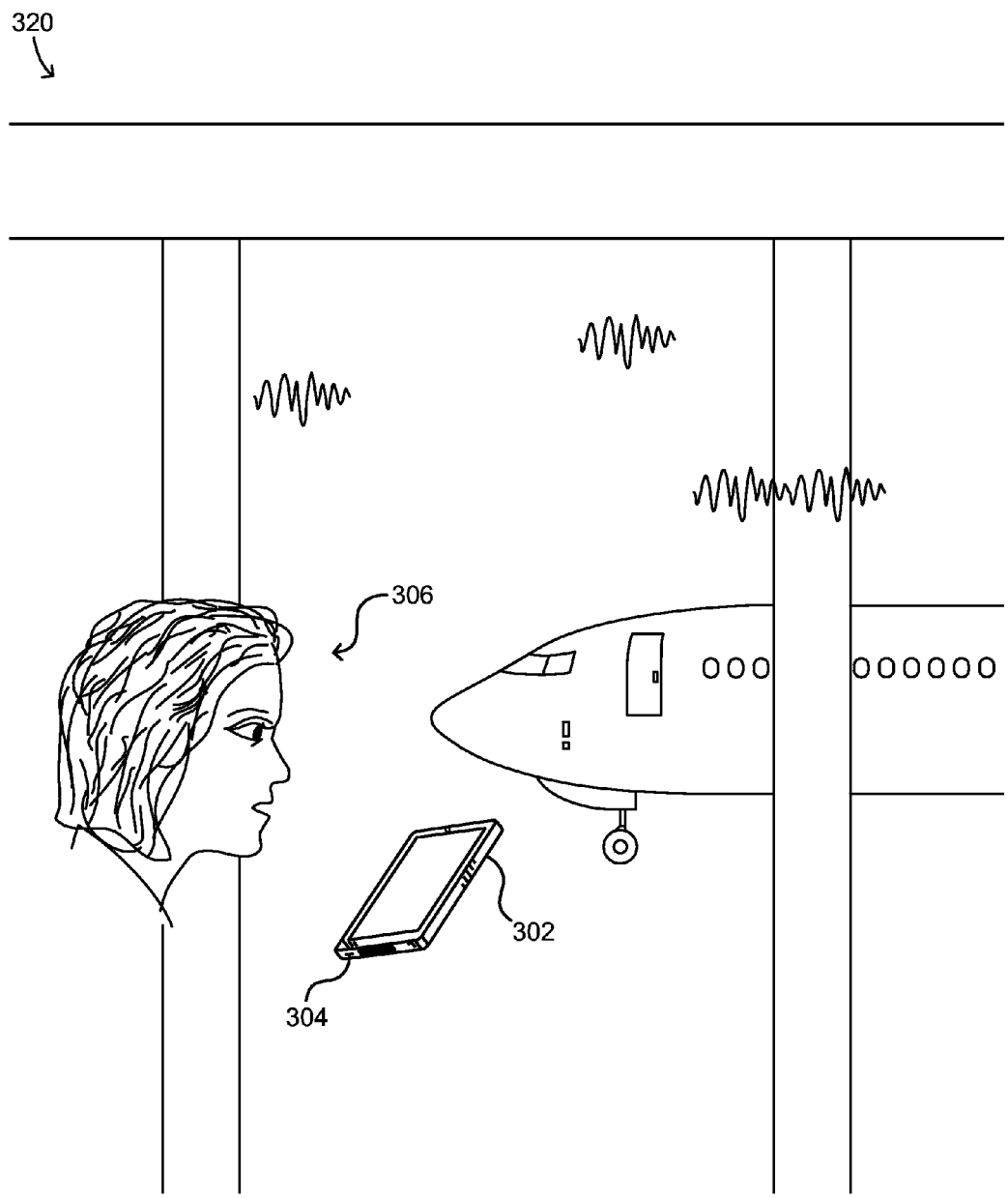
FIG. 3B illustrates an example environment in which auditory environment recognition can be utilized.
Figure 3C:
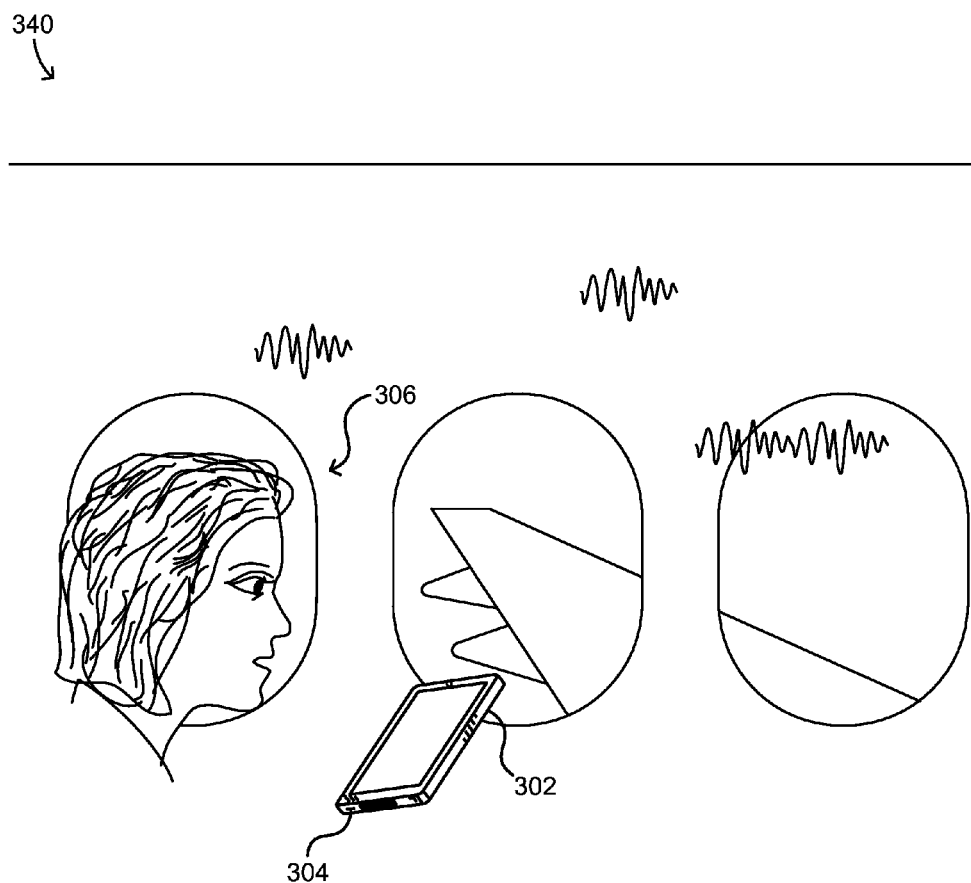
FIG. 3C illustrates an example environment in which auditory environment recognition can be utilized.
Figure 3D:
FIG. 3D illustrates an example environment in which auditory environment recognition can be utilized.
Figure 3E:
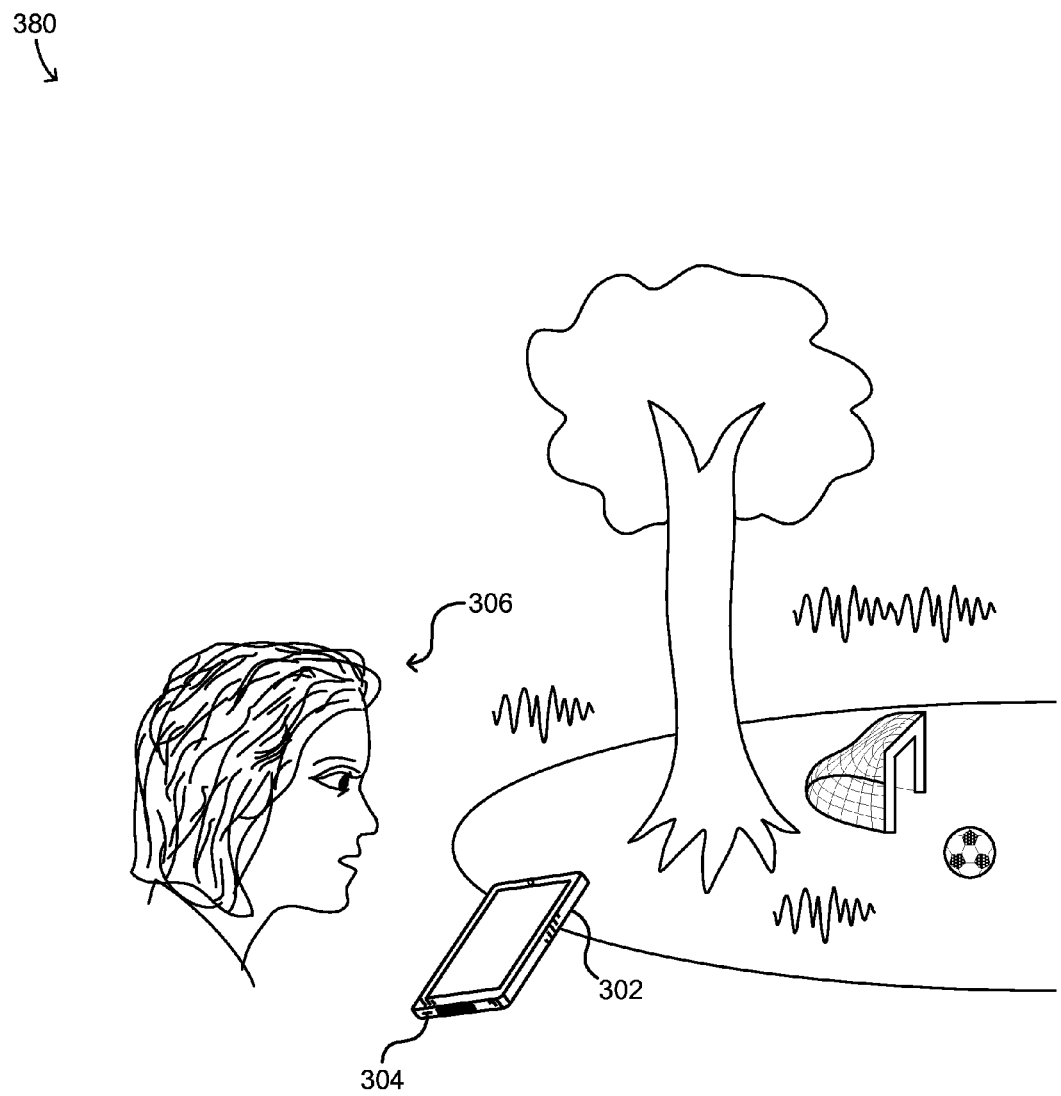
FIG. 3E illustrates an example environment in which auditory environment recognition can be utilized.

FIG. 3A though FIG. 3E illustrate example environments in which auditory environment recognition can be utilized. In particular, FIG. 3A though FIG. 3E involve examples of classifying and/or categorizing locations, which can be used to generate the associations between audio models and environments.

FIG. 3A illustrates an example environment 300 in which auditory environment recognition can be utilized. In FIG. 3A, there can be a computing device 302 comprising at least one microphone 304 and a user 306 operating the device 302. There can be one or more sounds in the example environment 300, including sounds of talking, mugs clanking, music and/or television playing, etc. At least some of the one or more sounds can be captured as audio data by the at least one microphone 304 on the computing device 302. The captured audio data can be compared with one or more audio models to find a matching audio model. In this example, the matching audio model can include acoustics related to talking, mugs clanking, music and/or television playing, etc., and the matching model can be associated with a bar environment. Accordingly, the current environment of the captured audio data can be identified as being the environment associated with the matching audio model—a bar environment.

The captured audio data can also be used to categorize and/or label the location (e.g., address, map coordinates, etc.) of where the audio data was captured. (The location can be determined by GPS, radio signal multilateration, etc. on the computing device.) In some embodiments, if the location of where the audio data is captured has not been categorized and/or labeled, the location can be categorized/labeled as being a bar. For example, if a new bar has just opened at the location of the captured audio and there is no audio data already tagged/associated with the location, then the location can be tagged/associated with the captured audio data. Accordingly, the location can be categorized/labeled as being a bar, because the location is associated with the captured audio data that matches an audio model for a bar environment.

FIG. 3B illustrates an example environment 320 in which auditory environment recognition can be utilized. The example environment 320 can be an airport and can include airport related sounds, such as public address (PA) system announcements, footsteps, luggage rolling sounds, airplane take-off and landing sounds, etc. At least some of the airport sounds can be captured by the microphone 304 on the computing device 302. A matching audio model for the captured audio data, wherein the matching audio model can be associated with associated with an airport environment. Thus the current environment of the captured audio data can be identified to be at an airport. Accordingly, the location of where the audio data was captured can be classified/labeled as being an airport.

FIG. 3C illustrates an example environment 340 in which auditory environment recognition can be utilized. FIG. 3C shows the user 306 and the computing device 302 in the example environment 340 which takes the form of an inside of an airplane. The microphone 304 on the computing device 302 can capture audio content audible from inside the airplane, such as sounds of the passengers talking, announcements from the captain and/or crew, seatbelts buckling/unbuckling, plane engines noises, etc. The captured audio content (i.e., audio data) can be compared with one or more audio models to determine a matching audio model, which can be associated with an airplane interior environment. The current environment of the captured audio content can thus be identified as an airplane interior environment.

In some embodiments, the computing device 302 can perform an operation in response to identifying the current environment. For example in FIG. 3C, in response to the current environment being identified as the interior of an airplane, the computing device 302 can switch into a setting (e.g., Airplane Mode) that suspends some of the device's signal transmitting functions (e.g., which prevents the device from calling, text messaging, and/or accessing the Internet) while still allowing use of some other functions that do not require signal transmission (e.g., off-line games, off-line document editing, etc.). In some embodiments, the computing device 302 can prompt the user 306 and ask him/her whether he/she wants to switch the device 302 into the setting (e.g., Airplane Mode) in response to identifying the current environment of the captured audio data as being the interior of an airplane. In some embodiments, the computing device 302 can automatically switch into the setting (e.g., Airplane Mode) when the captured audio data matches an audio model that is associated with the sound of an engine about to take off.

FIG. 3D illustrates an example environment 360 in which auditory environment recognition can be utilized. FIG. 3D shows the user 306 and the computing device 302 in the example environment 360 which takes the form of a park. In the example of FIG. 3D, there can be a musical concert at the park. The (microphone 304 on the) computing device 302 can capture audio including the music from the concert as well as other sounds from the concert, such as the shouting from the audience members, the singing by the audience members, crickets chirping, etc. In some embodiments, the captured audio can be compared with one or more audio models to find a match. The match can be an audio model having audio properties similar to the captured audio from the concert. For example, one of the audio models can be generated based on a previous concert (e.g., at the same park last year, at a different concert venue yesterday, etc.) and the audio model can be determined to be the matching model for the captured audio data. The matching audio model can provide information, such as the name of the performers (e.g., singer, band, etc.), the name of the event (e.g., musical festival, concert, tour, etc.), and other information. For example, the matching audio model can have been tagged/associated with the information when the audio model was generated. Therefore, in response to the captured audio being matched with the matching audio model, the current environment of the captured audio can be identified as, for example, the ABC Band's 2012 USA Tour Concert at Central Park, N.Y. (and the location of the captured audio can be categorized/labeled as being, for example, a concert at a park). In some embodiments, the captured audio can be used in combination with a location determine technique (e.g., GPS, radio signal multilateration, etc.) on the device 302 to identify and/or categorize/label the current environment/location.

FIG. 3E illustrates an example environment 380 in which auditory environment recognition can be utilized. FIG. 3E shows the example park of FIG. 3D. However, instead of the park being a venue for a concert as shown in FIG. 3D, the park has been made into a venue for people to play soccer, for example. There can be audio associated with a soccer game being played at the park. The audio can include coaches shouting, players communicating with each other, audience members cheering, food and drinks being sold, etc. The audio can be captured by (the microphone 304 on) the computing device 302 and an audio model matching the captured audio can be located (e.g., the audio model can comprise sounds associated with a soccer game at the park). From the matching audio model, the current environment and/or location of the captured audio can be identified and/or categorized/labeled as being a sports game at the park.

Figure 4:
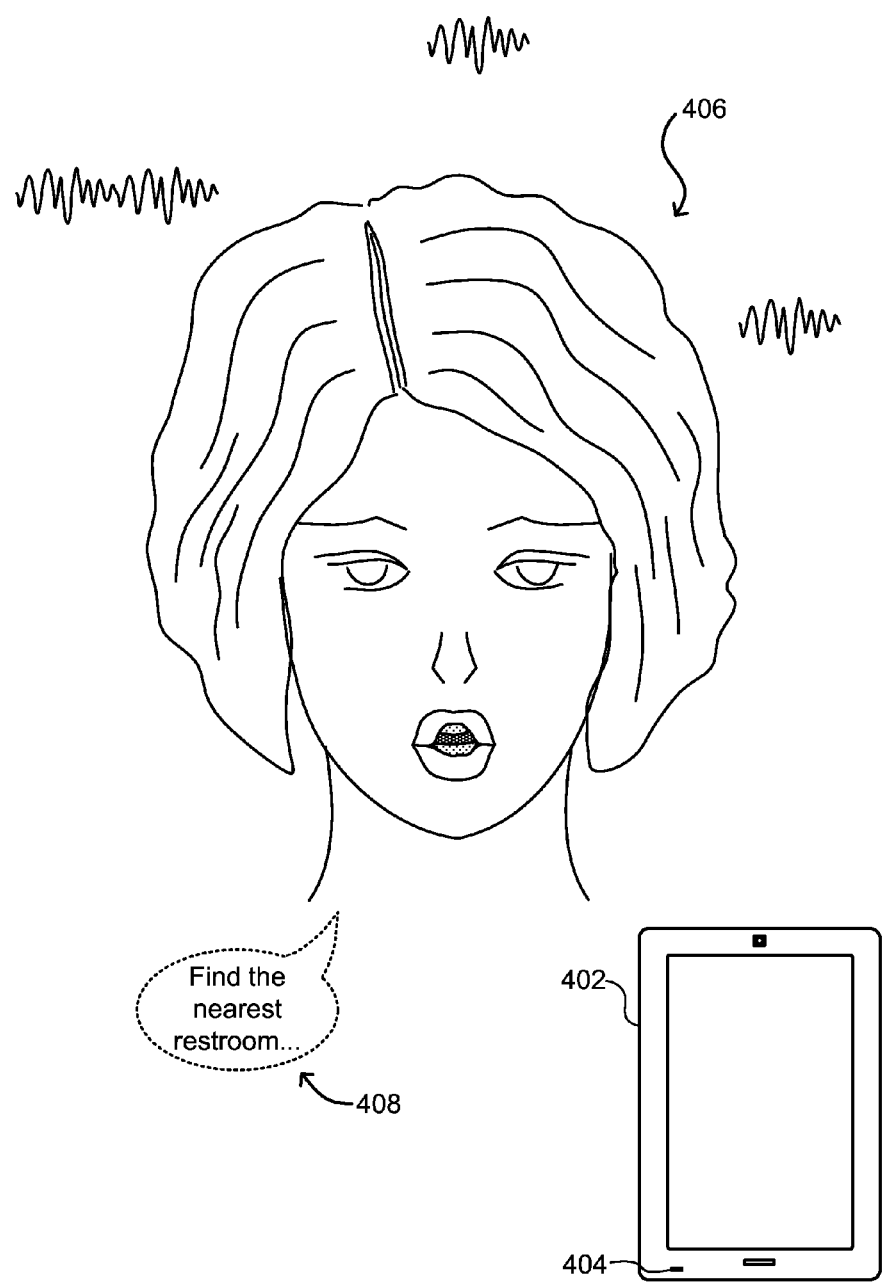
FIG. 4 illustrates an example device embodiment operated by a user during which auditory environment recognition can occur.

FIG. 4 illustrates an example device embodiment operated by a user during which auditory environment recognition can occur. FIG. 4 shows an example computing device embodiment 402 comprising at least one microphone 404, the example computing device 402 being operated by the user 406. In some embodiments, auditory environment recognition can be utilized to improve a computing task such as speech recognition.

One or more sounds in the environment can be captured by the microphone 404 on the device 402. The sounds can be compared with audio models to determine a match. From the match, a current environment of the captured sounds can be identified. In response to identifying the current environment, an appropriate noise filter (e.g., dependent upon the identified current environment) can be applied during speech recognition.

For example, if the current environment is identified as being a mall, then a noise filtering technique customized for the mall (e.g., a noise filtering algorithm optimized for the mall) can be utilized. In response to the user 406 speaking one or more words 408 (e.g., "Find the nearest restroom") to be captured for speech recognition, the noise filtering technique can filter out the background noise from the mall and improve the quality of the words 408 captured.

Figure 5:
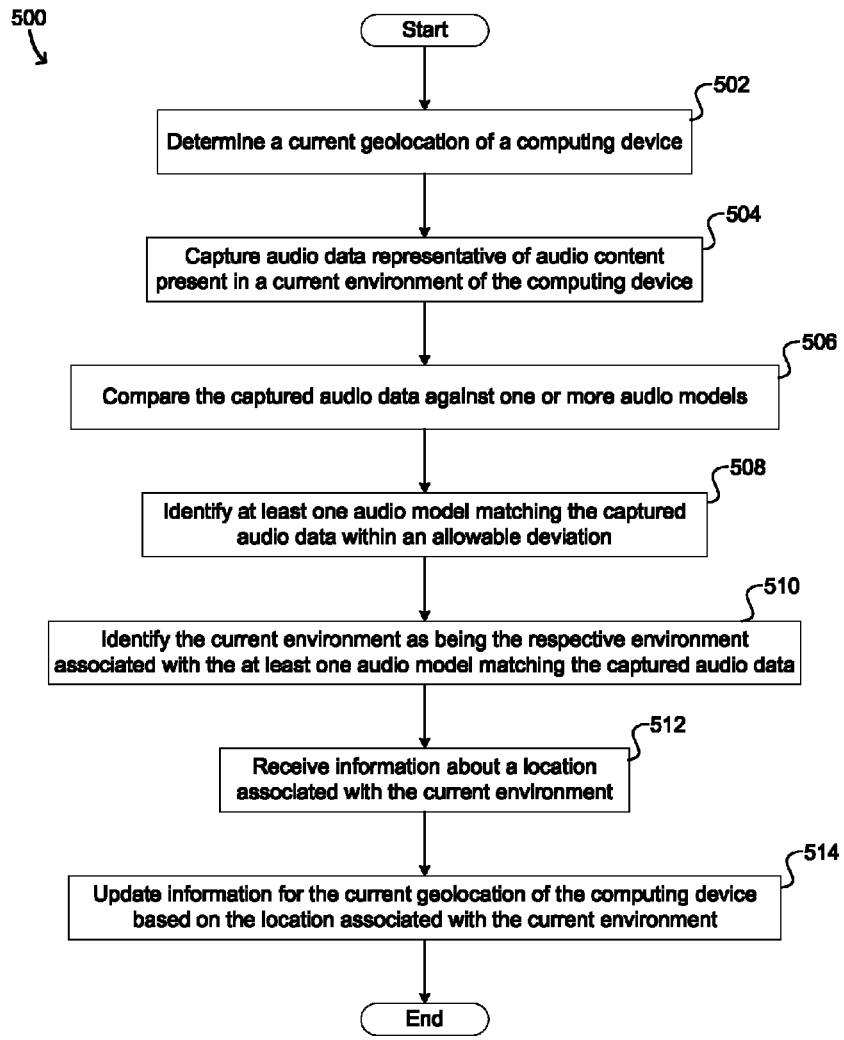
FIG. 5 illustrates an example method embodiment for auditory environment recognition.

FIG. 5 illustrates an example method embodiment for movable robotic mounting. It should be understood that there can be additional, fewer, or alternative steps performed in similar or alternative orders, or in parallel, within the scope of the various embodiments unless otherwise stated. In some embodiments, the example method embodiment 500 can start with determining a current geolocation of a computing device, at step 502. The determining of the current geolocation can, for example, be based on at least one of a radio signal multilateration or a global positioning system (GPS). At step 504, the example method 500 can capture audio data representative of audio content present in a current environment of the computing device. The capturing of the audio data can be performed using one or more microphones on the computing device.

Step 506 involves comparing the captured audio data against one or more audio models. Each of the audio models can be associated with a respective environment. The method 500 can identify at least one audio model matching the captured audio data within an allowable deviation, at step 508. At step 510, the example method 500 can identify the current environment as being the respective environment associated with the at least one audio model matching the captured audio data.

The method 500 can receive information about a location associated with the current environment, at step 512. The location can be within a specified range of the determined current geolocation of the computing device. Then at step 514, the method can update information for the current geolocation of the computing device based at least in part upon the location associated with the current environment.

Figure 6:
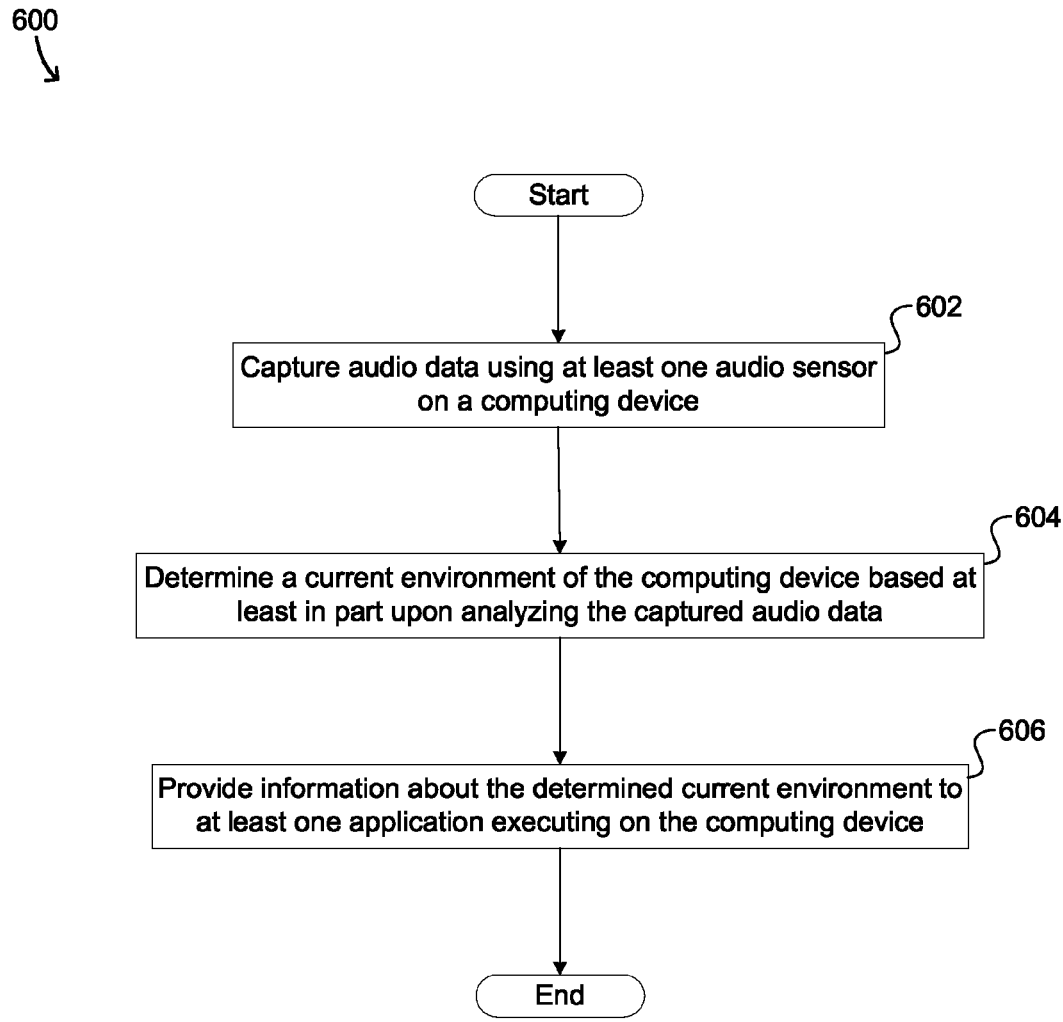
FIG. 6 illustrates an example method embodiment for auditory environment recognition.

FIG. 6 illustrates an example method embodiment for movable robotic mounting. Again, it should be understood that there can be additional, fewer, or alternative steps performed in similar or alternative orders, or in parallel, within the scope of the various embodiments unless otherwise stated. At step 602, the example method embodiment 600 can capture audio data using at least one audio sensor on a computing device. At step 604, the example method 600 can determine a current environment of the computing device based at least in part upon analyzing the captured audio data. In some embodiments, analyzing the captured audio data can include comparing the captured audio data with one or more audio models. Each of the audio models can be associated with a respective environment. In some embodiments, the current environment can be determined based on the respective environment associated with an audio model matching the captured audio data within an allowable deviation. Step 606 can involve providing information about the determined current environment to at least one application executing on the computing device. In some embodiments, the application can be configured to adjust at least one functional aspect based at least in part upon the determined current environment.

In some embodiments, the comparing of the captured audio data with the one or more audio models can be based on searching for and matching audio patterns, frequencies, pitch, tone, and other audio properties.

In some embodiments, the captured audio content/data can be utilized for map building. For example, if one or more users capture audio content at various locations, the captured audio content at the various locations can be uploaded to a map and/or directory for storage. Over time, many of the locations on the map and/or directory will have audio content associated/tagged with them. In some embodiments, the generating of the one or more audio models and associated environment can be based on crowdsourcing.

In some embodiments, acoustic environment recognition can adjust a setting on the computing device based on the identified current environment. For example, if the current environment is identified as being an environment with a noise level above a maximum threshold, the vibration setting of the computing device is increased. In another example, if the current environment is identified as being an interior of an airplane about to take off (e.g., having engine noise resembling that of a plane about to take off), then an airplane mode setting on the computing device can be initiated.

Various embodiments consistent with the present disclosure can also work in conjunction with one or more sensors on the computing device, such as a global positioning system chip, a radio signal transceiver configured to facilitate in the determining of location information based on radio signal multilateration, a WiFi transceiver configured to facilitate in the determining of location information based on which WiFi network the device is connected to, and/or other sensors/technologies available on the computing device. For example, if the current environment is identified as being in the user's car and a movement detector on the computing device detects acceleration, then the computing device can be switched into a car mode (e.g., with bigger buttons, provides hands-free options, initiates navigation system, etc.).

Figure 7:
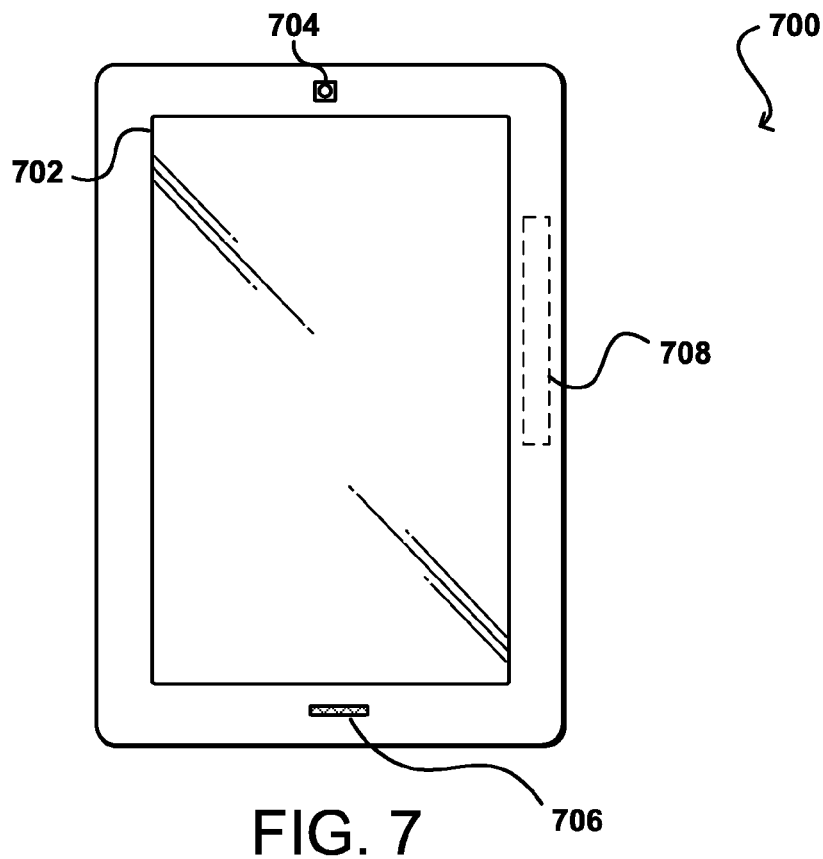
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
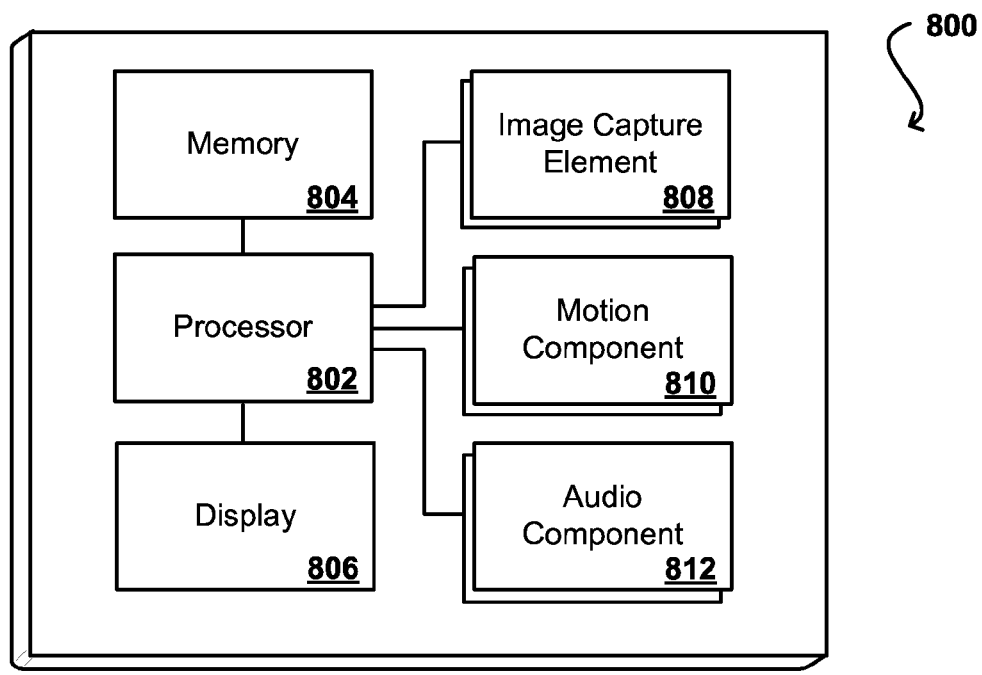
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
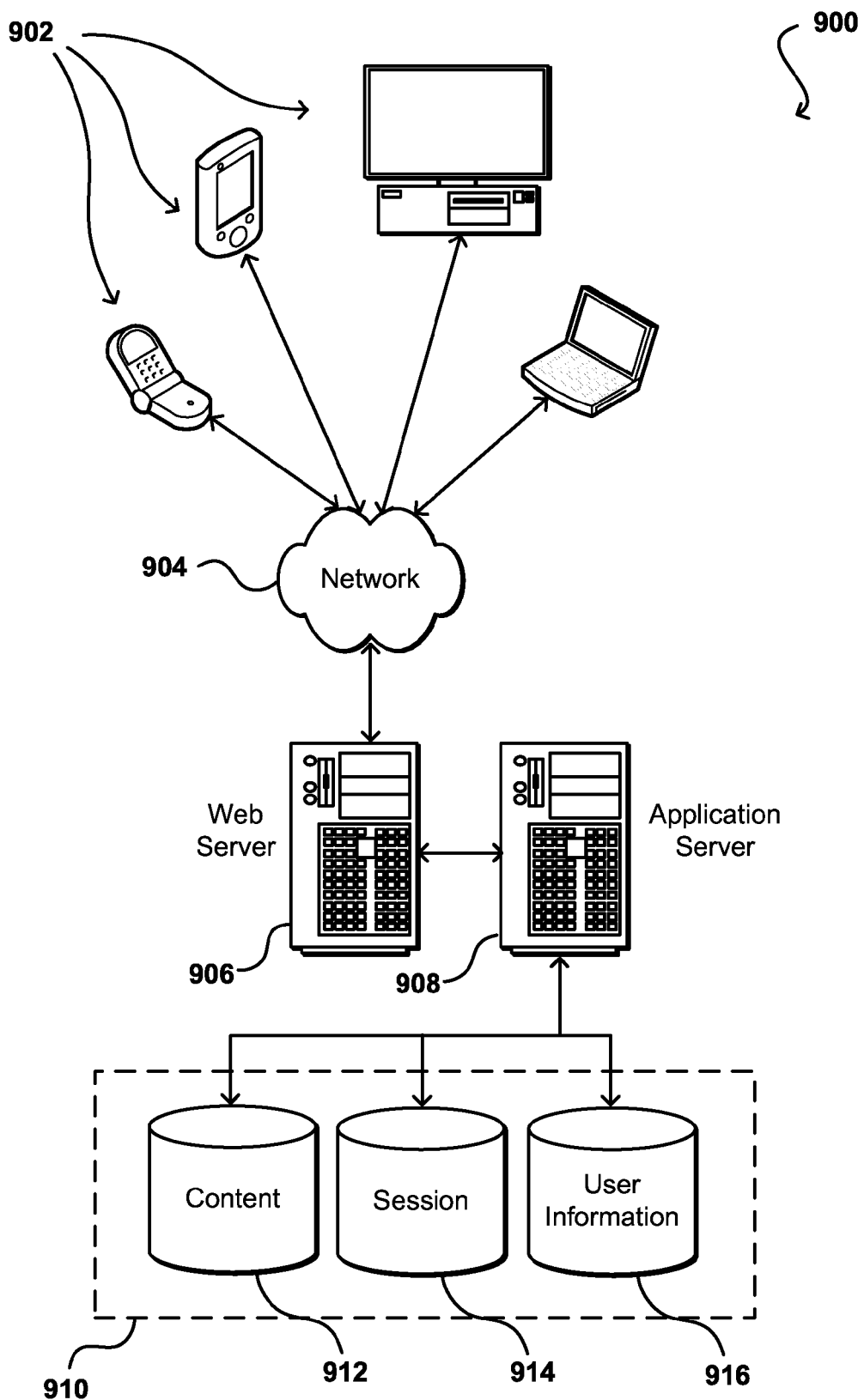
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for location refinement utilizing acoustic environment recognition, comprising:
   determining a current geolocation of a computing device;
   capturing audio data representative of audio content present in a current environment of the computing device using one or more microphones on the computing device;
   comparing the captured audio data against one or more audio models, each of the audio models associated with a respective environment;
   identifying at least one audio model matching the captured audio data within an allowable deviation;
   identifying the current environment as being the respective environment associated with the at least one audio model matching the captured audio data;
   processing the captured audio data using a noise filtering technique, wherein the noise filtering technique is based at least on the at least one audio model matching the captured audio data;

receiving information about a location associated with the current environment, the location being within a specified range of the current geolocation of the computing device; and updating information for the current geolocation of the computing device based at least in part upon the location associated with the current environment.

2. The computer-implemented method of claim 1, wherein the information about the location associated with the current environment includes an address of the current environment and wherein the updating of the information for the current geolocation of the computing device includes adjusting a representation of the current geolocation to be nearer in distance to a representation of the address.

3. The computer-implemented method of claim 1, wherein the one or more audio models are generated based on audio information captured by at least a second computing device at the respective environment associated with the at least one audio model matching the captured audio data.

4. The computer-implemented method of claim 1, further comprising:

transmitting the captured audio data and the updated information for the current geolocation to a server configured to store information about at least one of a map or a directory.

5. The computer-implemented method of claim 1, wherein the noise filtering technique is based on the respective environment associated with the at least one audio model, and filters background noise from the captured audio data, further wherein processing the captured audio data using the noise filtering technique generates noise-filtered audio data, the method further comprising:

performing speech recognition on the noise-filtered audio data.

6. A computer-implemented method comprising:

capturing audio data using at least one audio sensor on a computing device;

determining information about a current environment of the computing device based at least in part upon analyzing the captured audio data, wherein data representing a noise level of the current environment is above a threshold;

providing the information about the determined current environment to at least one application executing on the computing device;

generating noise-filtered audio data by using a noise filtering technique on the captured audio data, wherein the noise filtering technique is based on the information about the current environment; and performing speech recognition on the noise-filtered audio data.

7. The computer-implemented method of claim 6, further comprising:

determining a current geolocation of the computing device to be utilized by the application, wherein the application is a mapping application; and updating information for the current geolocation of the computing device based at least in part upon location information received for the current environment.

8. The computer-implemented method of claim 6, wherein the determining information about the current environment includes identifying a classification for the current environment, wherein the providing the information about the current environment includes providing at least the classification for the current environment to the application, the method further comprising determining a location for the current environment and creating an entry corresponding to the current environment at the location in at least one of a map, a directory, or a database.

9. The computer-implemented method of claim 6, wherein the analyzing of the captured audio data includes comparing the captured audio data with a plurality of audio models, each audio model being associated with a respective environment, and wherein determining information about the current environment is based on an audio model matching the captured audio data within an allowable deviation.

10. The computer-implemented method of claim 9, wherein the audio model matching the captured audio data within the allowable deviation is based on at least one match with respect to at least one of an audio pattern, frequency, pitch, or tone between the captured audio data and the audio model.

11. The computer-implemented method of claim 9, wherein the plurality of audio models is stored in a database and generated based on audio data captured by a plurality of devices external to the computing device.

12. The computer-implemented method of claim 9, wherein the captured audio data is utilized to update the plurality of audio models.

13. The computer-implemented method of claim 6, further comprising adjusting a setting of the computing device based on the information about the current environment.

14. The computer-implemented method of claim 13, wherein the setting is a vibration intensity setting, and adjusting the setting of the computing device comprises increasing the vibration intensity setting.

15. The computer-implemented method of claim 13, wherein the setting is an airplane mode setting corresponding to information about an interior of an airplane.

16. The computer-implemented method of claim 6, wherein the noise-filtering technique filters background noise from the captured audio data to generate the noise-filtered audio data.

17. A computing device comprising:

at least one microphone;

a processor; and a memory device including instructions that, when executed by the processor, cause the computing device to:

capture audio data using the at least one microphone;

determine information about a current environment of the computing device based at least in part upon analyzing the captured audio data, wherein data representing a noise level of the current environment is above a threshold;

provide the information about the current environment to at least one application executing on the computing device;

generate noise-filtered audio data by using a noise filtering technique on the captured audio data, wherein the noise filtering technique is based on the information about the current environment; and perform speech recognition on the noise-filtered audio data.

18. The computing device of claim 17, further comprising:

at least one of a global positioning system chip or a radio signal transceiver, each configured to be capable of determining a current geolocation of the computing device to be utilized by the application, wherein the application is a mapping application, and the instructions, that when executed by the processor, further cause the computing device to:

update information for the current geolocation of the computing device based at least in part upon location information received for the current environment.

19. The computing device of claim 17, wherein the determine information about the current environment includes identify a classification for the current environment, wherein the provide the information about the current environment includes provide at least the classification for the current environment to the application, and the instructions that, when executed by the processor, further cause the computing device to:

determine a location for the current environment and create an entry corresponding to the current environment at the location in at least one of a map, a directory, or a database.

20. The computing device of claim 17, wherein the noise-filtering technique filters background noise from the captured audio data to generate the noise-filtered audio data.

21. A non-transitory computer-readable storage medium including instructions for identifying elements, the instructions when executed by a processor of a computing device causing the computing device to:

capture audio data using at least one audio sensor on the computing device;

determine information about a current environment of the computing device based at least in part upon analyzing the captured audio data, wherein data representing a noise level of the current environment is above a threshold;

provide the information about the current environment to at least one application executing on the computing device;

generate noise-filtered audio data by using a noise filtering technique on the captured audio data, wherein the noise filtering technique is based on the information about the current environment; and perform speech recognition on the noise-filtered audio data.

22. The non-transitory computer-readable storage medium of claim 21, wherein the analyzing of the captured audio data includes comparing the captured audio data with a plurality of audio models, each audio model being associated with a respective environment, and wherein the determine the information about the current environment is based on the respective environment associated with an audio model matching the captured audio data within an allowable deviation.

23. The non-transitory computer-readable storage medium of claim 21, the instructions when executed by a processor of a computing device further causing the computing device to at least one of refine a current location of the computing device, identify a classification for the current environment, or adjust a setting of the computing device based on the current environment.

24. The non-transitory computer-readable storage medium of claim 21, the instructions when executed by a processor of a computing device further causing the computing device to increase a vibration intensity setting of the computing device.

25. The non-transitory computer-readable storage medium of claim 21, the instructions when executed by a processor of a computing device further causing the computing device to initiate an airplane mode setting corresponding to information about an interior of an airplane.

26. The non-transitory computer-readable storage medium of claim 21, wherein the noise-filtering technique filters background noise from the captured audio data to generate the noise-filtered audio data.

* * * * *